(12) United States Patent
Schroeder

(10) Patent No.: US 11,565,561 B2
(45) Date of Patent: Jan. 31, 2023

(54) AMPHIBIOUS ALL-TERRAIN VEHICLE

(71) Applicant: Ted W Schroeder, Springfield, VA (US)

(72) Inventor: Ted W Schroeder, Springfield, VA (US)

(*) Notice: Subject to any disclaimer, the term of this patent is extended or adjusted under 35 U.S.C. 154(b) by 82 days.

(21) Appl. No.: 17/227,342

(22) Filed: Apr. 11, 2021

(65) Prior Publication Data

US 2021/0316583 A1 Oct. 14, 2021

Related U.S. Application Data

(60) Provisional application No. 63/009,605, filed on Apr. 14, 2020.

(51) Int. Cl.
*B60F 3/00* (2006.01)

(52) U.S. Cl.
CPC .......... *B60F 3/0015* (2013.01); *B60F 3/0038* (2013.01)

(58) Field of Classification Search
CPC ......... B60F 3/00; B60F 3/0015; B60F 3/0038
See application file for complete search history.

(56) References Cited

U.S. PATENT DOCUMENTS

| | | | | | |
|---|---|---|---|---|---|
| 2,758,561 | A | * | 8/1956 | Emils | B60F 3/0015 180/9.1 |
| 3,403,654 | A | * | 10/1968 | Wilson | B60F 3/0015 114/280 |
| 4,961,395 | A | * | 10/1990 | Coast | B62D 55/202 305/137 |
| 6,062,156 | A | * | 5/2000 | Radke | B63B 34/10 440/12.5 |

FOREIGN PATENT DOCUMENTS

WO WO-2008094911 A1 * 8/2008 ............ B60F 3/0015

* cited by examiner

*Primary Examiner* — Stephen P Avila
(74) *Attorney, Agent, or Firm* — Steven R. Fairchild

(57) ABSTRACT

The present invention is an amphibious all-terrain vehicle. This amphibious all-terrain vehicle includes a boat-shaped hull and a continuous track system that is configured to provide propulsion at multiple speeds while in water. The amphibious all-terrain vehicle includes a drive train, a suspension system having one or more tracks, an operator's station, and one or more handle bars as a steering system.

6 Claims, 3 Drawing Sheets

AMPHIBIOUS ALL-TERRAIN VEHICLE

CROSS REFERENCE TO RELATED APPLICATION

The present application is a continuation-in-part of U.S. Provisional Patent Application 63/009,605, filed on Apr. 14, 2020, which is fully incorporated herein by reference.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present invention generally relates to all-terrain vehicles. Specifically, this invention relates to an all-terrain vehicle constructed to be mobile on both land and in water, as a manned or unmanned vehicle with a continuous track system.

BACKGROUND OF THE INVENTION

It has become a common necessity to have a versatile form of transportation. An all-terrain vehicle which seamlessly and efficiently switches from land to water allows people to extend their range of transportation.

Various prior art off-highway vehicles have been devised as utility vehicles for access to areas having water, rugged, and land terrains. The problem, however, with the conventional off-highway vehicles is that most include the complexities of gear and pulley systems. These are highly prone to failure as a means for translating power from an engine to other respective moving parts, namely the wheels and other propulsion systems.

The present invention is an amphibious off-highway vehicle which provides significant advantages and overcomes the disadvantages over the prior art.

SUMMARY OF THE INVENTION

An all-terrain vehicle comprising:
a boat shaped hull;
a right-side continuous track system consisting of a right-side idler sprocket, a right-side drive sprocket, at least one right-side roller-wheel, at least one right-side return roller, and a series of right-side paddles that form a continuous track around the right-side continuous track system;
a left-side continuous track system consisting of an left-side idler sprocket, a left-side drive sprocket, at least one left-side roller-wheel, at least one left-side return roller, and a series of left-side paddles that form a continuous track around the left-side continuous track system;
a left primary suspension system;
a right primary suspension system;
a left secondary suspension system;
a right secondary suspension system;
at least one right-side suspension stabilizer;
at least one left-side suspension stabilizer;
a right-side drive output shaft;
a left-side drive output shaft;
an operator's seat;
at least one headlight;
an operator's display panel;
an engine; and
at least one handle bar.

The all-terrain vehicle of [0007], wherein the boat-shaped hull provides buoyancy to the all-terrain vehicle while immobile in water.

The all-terrain vehicle of [0007], wherein the right-side continuous track system and the left-side continuous track system lift the all-terrain vehicle when it moves at a speed greater than 15 nautical miles per hour.

The all-terrain vehicle of [0007], wherein the boat-shaped hull is attached to the left-side continuous track system via the left secondary suspension system and an left-side suspension stabilizer.

The all-terrain vehicle of [0007], wherein the boat-shaped hull is attached to the right-side continuous track system via the right secondary suspension system and an right-side suspension stabilizer.

The all-terrain vehicle of [0007] wherein the right-side continuous track system and the left-side continuous track system act in concert to move the all-terrain vehicle forward, backward, to the right, or to the left.

The all-terrain vehicle of [0007] wherein the right-side continuous track system receives power from the engine from the right-side drive output shaft.

The all-terrain vehicle of [0007] wherein the left-side continuous track system receives power from the engine from the left-side drive output shaft.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF THE PREFERRED EMBODIMENTS

Figure 1:
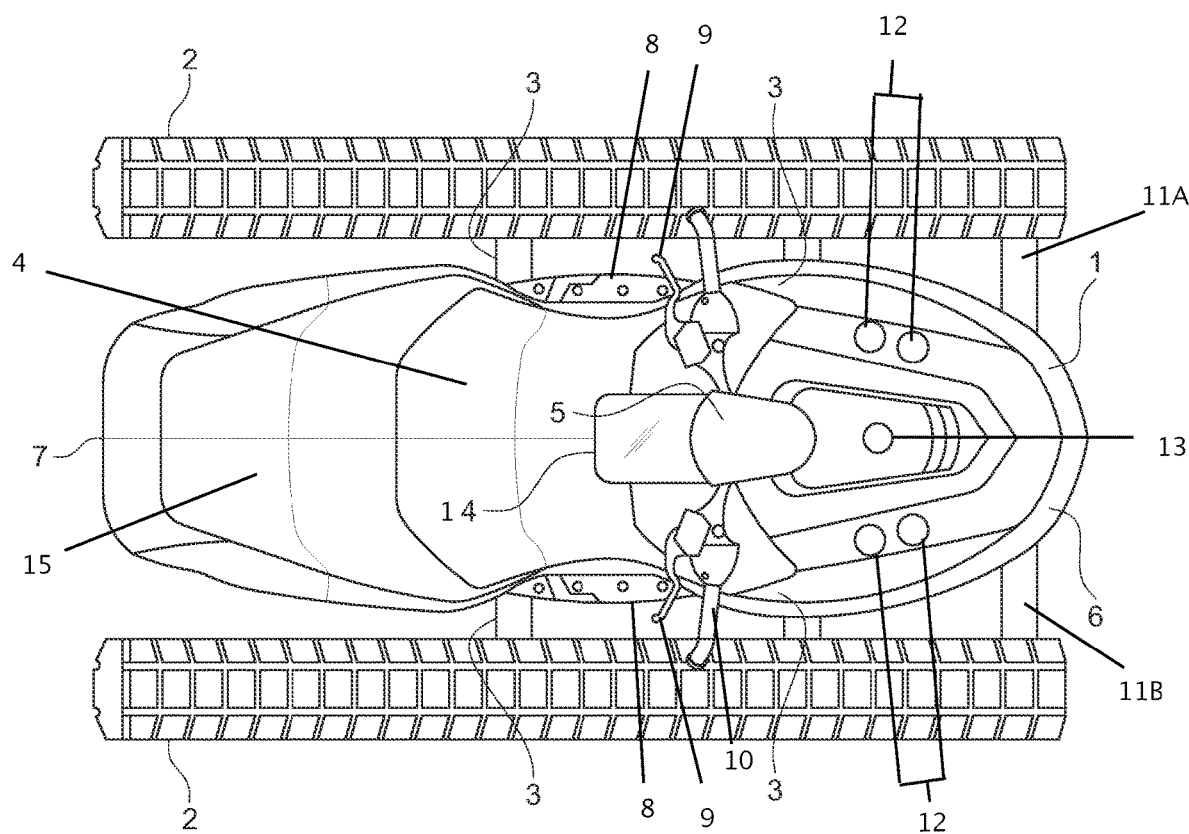
FIG. 1 depicts a top view of the amphibious all-terrain vehicle of the present invention.

For a more complete understanding of the present invention, the objects and advantages thereof, reference is now made to the ensuing descriptions.

The present invention is an amphibious all-terrain vehicle which overcomes the prior art problems related to the provision of all terrain devices and methods. The present invention provides a novel and improved form of all-terrain vehicle which is useful for any manned or unmanned vehicle with a continuous track system.

The amphibious all-terrain vehicle includes a boat-shaped hull and a continuous track system that is configured to provide propulsion at multiple speeds while in water. The amphibious all-terrain vehicle includes a drive train, a suspension system having one or more tracks, an operator's station, and one or more handle bars as a steering system.

The present invention provides for seamless transportation between land and waterways.

The amphibious all-terrain vehicle can easily travel to any location that is cut off by wheeled vehicles and deliver supplies to an isolated location or remove an injured person to safety, where most wheeled vehicles could not.

One application of the present invention is for the delivery of humanitarian aid. For example, it can be difficult to debark humanitarian aid from a ship to the shore after a massive storm.

Another application of the present invention is for military use. Amphibious troops and material, such as soldiers in the United States Marine Corps and their equipment, must be delivered from ship to land and then over land as the soldiers move to inland positions. The present invention enhances such military deployment.

Another application of the present invention is for recreational activities, as locating a lake-side picnic place. The vehicle can maneuver on the water and then return to lakeside beach for a picnic, then return the same way at the leisure of the user.

These anticipated applications can be done with ease and speed as it is expected that the present invention can travel over still water and land at speeds in excess of 45 and miles per hour, respectively.

The present invention can obtain such high speeds on water through the application of water skipping techniques to transport over water, in a wheeled or buoyant fashion. Water skipping relates to the concept of the tread on a continuous track that is able to lift the body of the vehicle out of the water while providing forward thrust. The upward thrust from the tracks reduces the drag of the vehicle by lifting it out of the water. Then the forward thrust is more efficient use of a paddle drive than the traditional wheeled paddle boats.

The amphibious all-terrain vehicle is configured to bypass flooded roads, travel across flooded areas, cross over-flowing rivers, then revert back onto solid ground. This allows the cheap and effective transport people and supplies after a severe storm.

Another application of the present invention is in the operation of snow-covered environments. The disclosed embodiments can naturally navigate winter environments and give access to the adventurer of any snow-covered land. The drive train and suspension system comprising one or more tracks provides freedom and comfort of at least two tracks over the snow, ice or other slippery conditions.

The amphibious all-terrain vehicle is configured to be manned or unmanned. In some examples, the vehicle can be driven by one or more drivers, autonomously, or via a remote driver utilizing a user equipment.

Propulsion on the water can be provided by an additional propeller or water jet to increase the speed.

Illustrative Example

Figure 2:
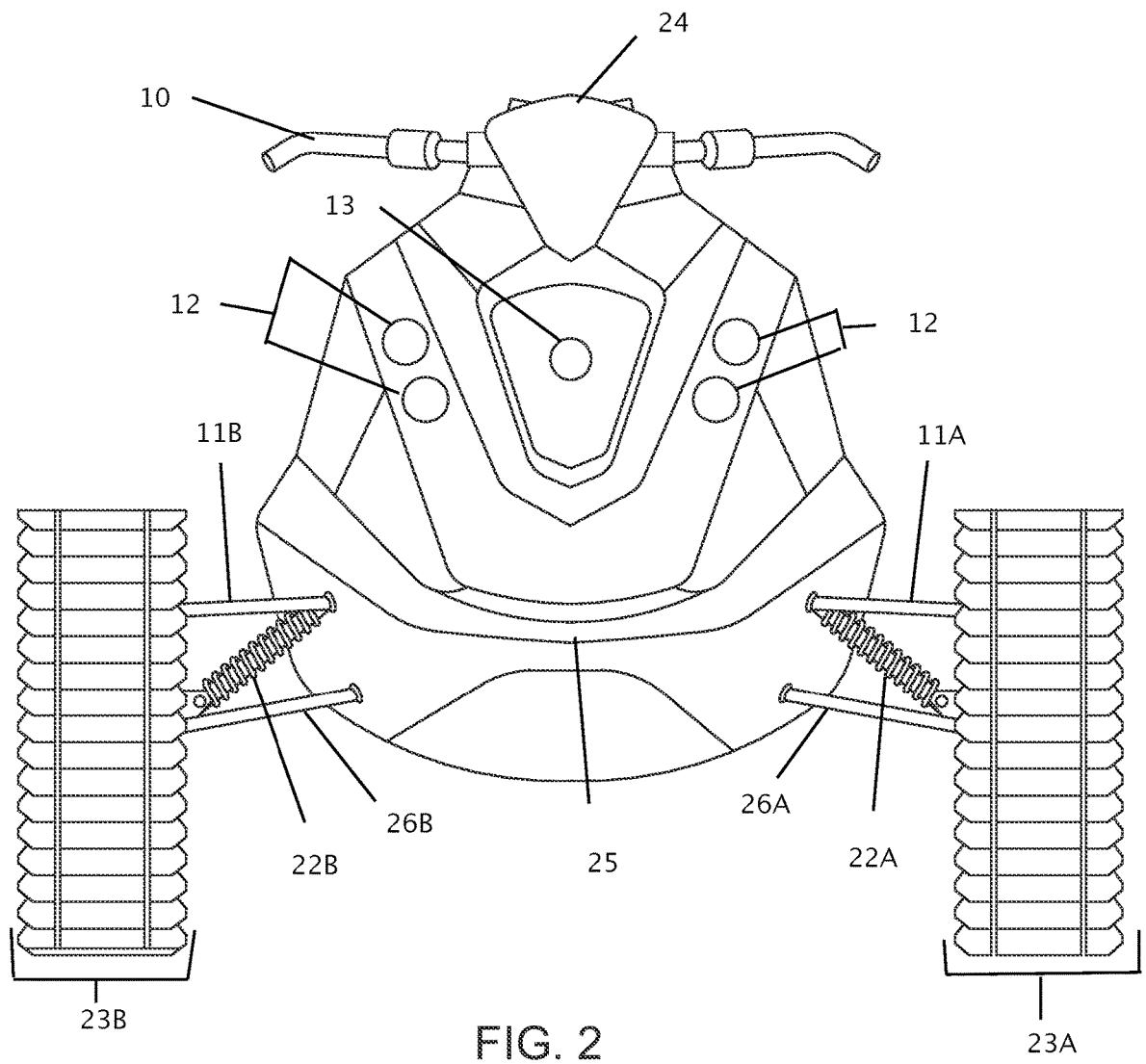
FIG. 2 depicts a front view of the amphibious all-terrain vehicle of the present invention.
Figure 3:
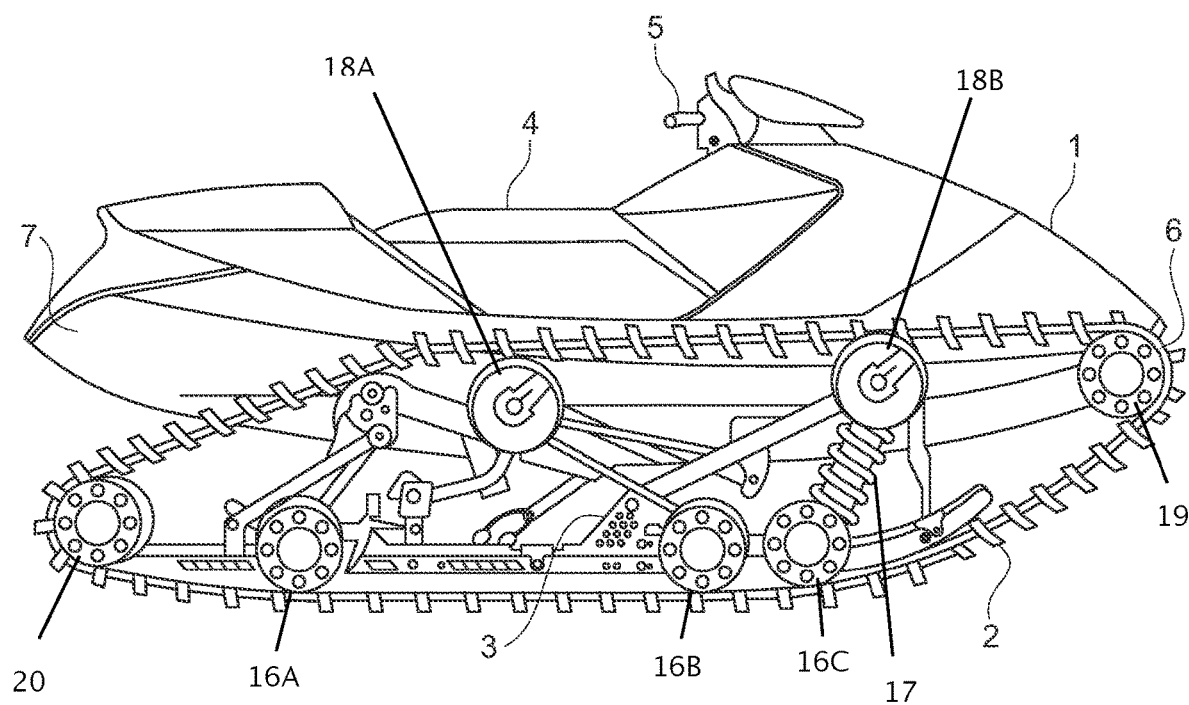
FIG. 3 depicts a right-side view of the amphibious all-terrain vehicle of the present invention.

Reference is made to FIGS. 1-3. FIG. 1 depicts a top view of the amphibious all-terrain vehicle of the present invention. FIG. 2 depicts a front view of the amphibious all-terrain vehicle of the present invention. FIG. 3 depicts a right-side view of the amphibious all-terrain vehicle of the present invention. A person of skill in the art would know that the left-side view of the present invention is an identical mirror-image to the view of the invention displayed in FIG. 3.

Boat-Shaped Hull

The present invention includes a boat-shaped hull (1), which gives the vehicle buoyancy it is at rest or at low speeds in the water. The boat-shaped hull (1) is configured as a single central hull, where it contains the overall frame of the vehicle. If tracks are utilized while in the water, then the motion of the tracks prevents the vehicle from sinking in the water. In a preferred embodiment, the boat shaped hull comprises of a frame of the off-highway vehicle.

Item (4) designates the operators' seat. This gives easy access to the controls, display panel, and gauges on the handle bars.

Item (6) depicts the front of the hull. Item (7) depicts the rear of the hull.

In a preferred embodiment, a maximum buoyancy is configured while the off-highway vehicle is at rest or at a low speed.

Item (12) designates the amphibious all-terrain vehicle's headlights. In a preferred embodiment, amphibious all-terrain vehicle craft has between two and four headlights. In an especially preferred embodiment, the amphibious all-terrain vehicle has four headlights.

Continuous Track System

The vehicle further includes a continuous track system (2) that is configured to provide propulsion at various speeds in the water. The continuous track system provides forward, backward, lateral or angular movement on land.

For instance, when there is a high rate of speed that is achieved by the vehicle, in water the continuous tracks provide propulsion and allows the craft to plane up on the water.

Along the continuous track system are a series of paddles (Item 2) that lift the craft out of the water and provide propulsion across the top of the water while at high speed. Lifting the hull out of the water reduces the friction and allows for higher speeds across the water. While the tracks are moving across the water, the track speeds are configured to independently adjust to turn the craft.

Item (16A) designates the rear most roller-wheel. Item (16B) designates the middle roller-wheel. Item (16C) designates the forward-most roller-wheel. This series of three roller-wheels serves to feed the track system on the lower portion of the continuous track system.

Item (18A) designates the rear return-roller while Item (18B) designates the forward return-roller. This series of two return-rollers serves to feed the track system on the upper portion of the continuous track system.

Item (19) designates the drive sprocket, which provides the continuous track system with shaft import power. Item (20) designates the idler sprocket, which enables the return loop of the continuous track system.

In one example, shifting the weight or the pitch of the tracks may aid in turning the craft in either direction. In another example, the craft can still move through the water by the propeller or water jet when not supported by the tracks.

While on land, the continuous track system can provide the energy for forward movement and direction control while utilizing a set of wheels, and/or a use of skid steering. The skid steering in combination or singularly can provide forward, backward, lateral, and angular movement on land.

Drive Train and Suspension System

The vehicle can further include a drive train and suspension system (3) that is configured to connect the power source of the engine or motor to a continuous track.

The drive train and suspension system is configured to connect the power source of the engine to a continuous track.

In a preferred embodiment, the suspension system is configured to allow for a smooth ride over rough terrain. In some examples, a single motor can be used in order to provide the energy for movement. In another example, multiple motors can be used in order to provide additional power, and propulsion on land or on water.

The suspension system (3) is configured to allow for a smooth ride over rough terrain, hills, mountainous areas, and rough patches of land. The suspension system 3 can comprise a series of springs or hydraulics to allow for a more responsive vehicle ride when encroaching one or more rough terrain areas, providing a buffer from the rough terrain.

Item (11A) designates the left drive output shaft and Item (11B) designates the right output shaft. Item (13) designates the engine radiator. Item (15) designates the road wheels, which are part of the track drive system. Item (17) designates the primary suspension system. Item (18) designates return rollers which are part of the continuous track system. Item (19) designates the drive sprocket. Item (20) designates the idler sprocket. Item (2) designates a paddle of the continuous track system. Item (22A) designates the left secondary suspension system and Item (22B) designates the right secondary suspension system. Item (23A) designates the left-side continuous track system while Item (23B) designates the right-side continuous track system. Item (24) designates the front shield for the protection of the operator's station. Item (25) designates the water tight hull. Item (26A) designates the left-side suspension stabilizer and Item (26B) designates the right-side suspension stabilizer.

Operator's Station

The operator's station comprises a seat (4) for a driver that allows close proximity of access to one or more controls or gauges on the steering system.

The steering is supported by one or more handlebars when in operation by a user who is riding the vehicle manually. The handlebars are in close proximity to an operator's seat (4) for a driver to sit and maintain close control of the one or more handlebars. The handlebars are configured with one or more controls or gauges. The one or more controls can comprise of a throttle or a braking system.

Item (8) designates the foot stands. In a preferred embodiment, the amphibious all-terrain vehicle has two foot stands below the operator's seat. This allows the operator to brace himself or herself during operation of the amphibious all-terrain vehicle. Item (9) designates brake controls. Item (10) designates the throttle control. In a preferred embodiment, the throttle control is embedded within the right-side handle bar. The operator increases the thrust of the amphibious all-terrain vehicle's engine by rotating the throttle control towards himself or herself.

Item (14) designates the operator's display panel. Item (15) designates a rear compartment. In a preferred embodiment, the rear compartment can be replaced with a second seat.

The Steering System

The steering system comprise one or more controls, a throttle, a braking system, and handle bars.

In a preferred embodiment, the steering system is configured to turn in a first direction resulting in a first track of the one or more tracks changing speed to make the turn in the first direction. The steering system is configured to turn in a second direction resulting in a second track of the one or more tracks to change speed to make the turn in the second direction.

Item (5) designates the handle bars. These provide contracts for the throttle and braking system. By turning the handle bars, the vehicle will turn by slowing one of the tracks, but not the other, thus making a turn.

Additionally, the handle bars are configured to turn in a first direction resulting in a first track of the one or more tracks slowing to make the turn in the first direction. The handle bars are further configured to turn in a second direction resulting in a second track of the one or more tracks slowing to make the turn in the second direction.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

Although the present invention has been described in terms of various embodiments, it is not intended that the invention be limited to these embodiments. Modification within the spirit of the invention will be apparent to those skilled in the art. For example, the server system can map a client identifier to multiple customers who have recently used the client system. The server system can then allow the user to identify themselves by selecting one of the mappings based preferably on a display of partial applicant-specific application information.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Some detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

The invention may be embodied in other specific forms without departing from the spirit of essential characteristics thereof. The present embodiments therefore to be considered in all respects as illustrative and not restrictive, the scope of the invention being indicated by the appended claims rather than by the foregoing description, and all changes which come within the meaning and range of equivalency of the claims are therefore intended to be embraced therein.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description comprises illustrative embodiments of the present invention.

As will be appreciated, the foregoing objects and examples are exemplary and embodiments need not meet all or any of the foregoing objects, and need not include all or any of the exemplary features described herein. Additional aspects and embodiments within the scope of the claims will be devised by those having skill in the art based on the teachings set forth herein.

While the invention has been described in connection with what are considered to be exemplary embodiments, it is to be understood that the invention is not limited to the disclosed embodiments, but on the contrary, is intended to cover various modifications and equivalent arrangements included within the spirit and scope of the appended claims.

I claim:

1. An all-terrain vehicle comprising:
    a rounded boat-shaped hull;
    a right-side continuous track system consisting of a right-side idler sprocket, a right-side drive sprocket, at least one right-side roller-wheel, at least one right-side return roller, and a series of right-side paddles that form a continuous track around the right-side continuous track system;
    a left-side continuous track system consisting of an left-side idler sprocket, a left-side drive sprocket, at least one left-side roller-wheel, at least one left-side return roller, and a series of left-side paddles that form a continuous track around the left-side continuous track system;
    a multi-part suspension system comprising a left primary suspension system, a right primary suspension system, a left secondary suspension system, and a right secondary suspension system;
    wherein the left primary suspension system connects at least one left-side roller-wheel with at least one left-side return roller;
    wherein the right primary suspension system connects at least one right-side roller-wheel with at least one right-side return roller;
    wherein the left secondary suspension system connects the left-side continuous track system with the rounded boat shaped hull;
    wherein the right secondary suspension system connects the right-side continuous track system with the rounded boat shaped hull;
    at least one right-side suspension stabilizer;
    at least one left-side suspension stabilizer;
    a right-side drive output shaft;
    a left-side drive output shaft;
    an operator's seat;
    at least one headlight;
    an operator's display panel;
    an engine; and
    at least one handle bar.

2. The all-terrain vehicle of claim 1, wherein the rounded boat-shaped hull provides buoyancy to the all-terrain vehicle while immobile in water.

3. The all-terrain vehicle of claim 1, wherein the right-side continuous track system and the left-side continuous track system lift the all-terrain vehicle upwards when the all-terrain vehicle moves at a speed greater than 20 nautical miles per hour through water.

4. The all-terrain vehicle of claim 1 wherein the right-side continuous track system and the left-side continuous track system act in concert to move the all-terrain vehicle forward, backward, to the right, or to the left.

5. The all-terrain vehicle of claim 1 wherein the right-side continuous track system receives power from the engine from the right-side drive output shaft.

6. The all-terrain vehicle of claim 1 wherein the left-side continuous track system receives power from the engine from the left-side drive output shaft.

* * * * *